(12) United States Patent
Sasaki et al.

(10) Patent No.: US 7,468,862 B2
(45) Date of Patent: Dec. 23, 2008

(54) MAGNETIC HEAD FOR PERPENDICULAR MAGNETIC RECORDING

(75) Inventors: Yoshitaka Sasaki, Milpitas, CA (US);
Hiroyuki Itoh, Milpitas, CA (US);
Joseph Smyth, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 409 days.

(21) Appl. No.: 11/455,774

(22) Filed: Jun. 20, 2006

(65) Prior Publication Data

US 2007/0291409 A1      Dec. 20, 2007

(51) Int. Cl.
*G11B 5/147*      (2006.01)
(52) U.S. Cl. .................................. 360/125.02
(58) Field of Classification Search ............ 360/125.02, 360/125.01, 123.6, 123.61, 122, 119.02, 360/125.15; 29/603.1, 603.13
See application file for complete search history.

(56) References Cited

U.S. PATENT DOCUMENTS

| | | | |
|---|---|---|---|
| 4,656,546 A | 4/1987 | Mallory | |
| 4,672,493 A | 6/1987 | Schewe | |
| 6,504,675 B1 | 1/2003 | Shukh et al. | |
| 7,417,824 B2 * | 8/2008 | Kameda | 360/125.02 |
| 2006/0098340 A1 * | 5/2006 | Kameda | 360/126 |
| 2007/0064343 A1 * | 3/2007 | Yazawa et al. | 360/125 |
| 2007/0268627 A1 * | 11/2007 | Le et al. | 360/126 |
| 2008/0002291 A1 * | 1/2008 | Balamane et al. | 360/125 |
| 2008/0088971 A1 * | 4/2008 | Sasaki et al. | 360/110 |
| 2008/0088972 A1 * | 4/2008 | Sasaki et al. | 360/110 |

* cited by examiner

*Primary Examiner*—Allen T Cao
(74) *Attorney, Agent, or Firm*—Oliff & Berridge, PLC

(57) ABSTRACT

A magnetic head comprises a pole layer and first and second coils located in regions sandwiching the pole layer. Each of the two coils is flat-whorl-shaped. The first coil incorporates an inner connecting portion and an outer connecting portion opposite to the inner connecting portion. The second coil also incorporates an inner connecting portion and an outer connecting portion opposite to the inner connecting portion. The inner connecting portion of the first coil is electrically connected to the inner connecting portion of the second coil. The outer connecting portion of the first coil is electrically connected to the outer connecting portion of the second coil, too. In such a manner the two coils are electrically connected to each other in parallel.

7 Claims, 13 Drawing Sheets

MAGNETIC HEAD FOR PERPENDICULAR MAGNETIC RECORDING

BACKGROUND OF THE INVENTION

1. Field of the Invention

The present invention relates to a magnetic head for perpendicular magnetic recording that is used for writing data on a recording medium by means of a perpendicular magnetic recording system.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared with the longitudinal magnetic recording system.

Like magnetic heads for longitudinal magnetic recording, magnetic heads for perpendicular magnetic recording typically used have a structure in which a reproducing (read) head having a magnetoresistive element (that may be hereinafter called an MR element) for reading and a recording (write) head having an induction-type electromagnetic transducer for writing are stacked on a substrate. The write head comprises a magnetic pole layer that produces a magnetic field in the direction orthogonal to the surface of the recording medium.

For the perpendicular magnetic recording system, it is an improvement in recording medium and an improvement in write head that mainly contributes to an improvement in recording density. It is a reduction in track width and an improvement in write characteristics that is particularly required for the write head to achieve higher recording density. On the other hand, if the track width is reduced, the write characteristics, such as an overwrite property that is a parameter indicating an overwriting capability, are degraded. It is therefore required to achieve better write characteristics as the track width is reduced.

A magnetic head used for a magnetic disk drive such as a hard disk drive is typically provided in a slider. The slider has a medium facing surface that faces toward a recording medium. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt called a skew of the magnetic head is created with respect to the tangent of the circular track, in accordance with the position of the magnetic head across the tracks.

In a magnetic disk drive of the perpendicular magnetic recording system that exhibits a better capability of writing on a recording medium than the longitudinal magnetic recording system, in particular, if the above-mentioned skew is created, problems arise, such as a phenomenon in which data stored on an adjacent track is erased when data is written on a specific track (that is hereinafter called adjacent track erasing) or unwanted writing is performed between adjacent two tracks. To achieve higher recording density, it is required to suppress adjacent track erasing. Unwanted writing between adjacent two tracks affects detection of servo signals for alignment of the magnetic head and the signal-to-noise ratio of a read signal.

A technique is known for preventing the problems resulting from the skew as described above, as disclosed in U.S. Pat. No. 6,504,675 B1, for example. According to this technique, the end face of the pole layer located in the medium facing surface is made to have a shape in which the side located backward along the direction of travel of the recording medium (that is, the side located closer to the air inflow end of the slider) is shorter than the opposite side.

In addition, a magnetic head comprising a pole layer and an auxiliary pole layer is disclosed in U.S. Pat. No. 6,504,675 B1. In the medium facing surface of this magnetic head, an end face of the auxiliary pole layer is located backward of the end face of the pole layer along the direction of travel of the recording medium.

As a magnetic head for perpendicular magnetic recording, a magnetic head comprising the pole layer and a shield is known, as disclosed in U.S. Pat. No. 4,656,546, for example. In the medium facing surface of this magnetic head, an end face of the shield is located forward of the end face of the pole layer along the direction of travel of the recording medium with a specific small space therebetween. Such a magnetic head will be hereinafter called a shield-type head. In the shield-type head the shield has a function of preventing a magnetic flux from reaching the recording medium, the flux being generated from the end face of the pole layer and extending in directions except the direction orthogonal to the surface of the recording medium. In addition, the shield has a function of returning the magnetic flux that has been generated from the end face of the pole layer and has magnetized the recording medium. The shield-type head achieves a further improvement in linear recording density.

U.S. Pat. No. 4,672,493 discloses a magnetic head having such a structure that magnetic layers are respectively provided forward and backward of a middle magnetic layer to be the pole layer along the direction of travel of the recording medium and that coils are respectively provided between the middle magnetic layer and the magnetic layer located forward and between the middle magnetic layer and the magnetic layer located backward. In this magnetic head the two coils are connected to each other in series. According to the magnetic head, it is possible to increase components in the direction orthogonal to the surface of the recording medium among components of the magnetic field generated from an end of the middle magnetic layer closer to the medium facing surface.

Reference is now made to FIG. 15 to describe a basic configuration of the shield-type head. FIG. 15 is a cross-sectional view of the main part of an example of the shield-type head. This shield-type head comprises: a medium facing surface 100 that faces toward a recording medium; a coil 101 for generating a magnetic field corresponding to data to be written on the medium; a pole layer 102 having an end located in the medium facing surface 100, allowing a magnetic flux corresponding to the field generated by the coil 101 to pass, and generating a write magnetic field for writing the data on the medium by means of the perpendicular magnetic recording system; a shield layer 103 having an end located in the medium facing surface 100 and having a portion located away from the medium facing surface 100 and coupled to the pole layer 102; a gap layer 104 provided between the pole layer 102 and the shield layer 103; and an insulting layer 105 covering the coil 101. An insulating layer 106 is disposed around the pole layer 102. The shield layer 103 is covered with a protection layer 107.

In the medium facing surface 100, the end of the shield layer 103 is located forward of the end of the pole layer 102 along the direction T of travel of the recording medium with a specific space created by the thickness of the gap layer 104. At least part of the coil 101 is disposed between the pole layer 102 and the shield layer 103 and insulated from the pole layer 102 and the shield layer 103.

The coil 101 is made of a conductive material such as copper. The pole layer 102 and the shield layer 103 are made of a magnetic material. The gap layer 104 is made of an insulating material such as alumina ($Al_2O_3$). The insulating layer 105 is made of photoresist, for example.

In the head of FIG. 15, the gap layer 104 is disposed on the pole layer 102 and the coil 101 is disposed on the gap layer 104. The coil 101 is covered with the insulating layer 105. One of the ends of the insulating layer 105 closer to the medium facing surface 100 is located at a distance from the medium facing surface 100. In the region from the medium facing surface 100 to the end of the insulating layer 105 closer to the medium facing surface 100, the shield layer 103 faces toward the pole layer 102 with the gap layer 104 disposed in between. Throat height TH is the length (height) of the portions of the pole layer 102 and the shield layer 103 facing toward each other with the gap layer 104 disposed in between, the length being taken from the end closer to the medium facing surface 100 to the other end. The throat height TH influences the intensity and distribution of the field generated from the pole layer 102 in the medium facing surface 100.

In the shield-type head as shown in FIG. 15, for example, it is preferred to reduce the throat height TH to improve the overwrite property. It is required that the throat height TH be 0.1 to 0.3 micrometer ($\mu m$), for example. When such a small throat height TH is required, the following problem arises in the head of FIG. 15.

In the head of FIG. 15, when the head is operated, there is a possibility that the insulating layer 105 expands due to the heat generated by the coil 101, and the end portion of the shield layer 103 closer to the medium facing surface 100 thereby protrudes. If the throat height TH is small, in particular, the portion of the shield layer 103 located between the insulating layer 105 and the medium facing surface 100 is thin, so that it is more likely that the end portion of the shield layer 103 closer to the medium facing surface 100 protrudes. The protrusion of the end portion of the shield layer 103 when the head is operated induces collision of the slider with the recording medium.

For the shield-type head as shown in FIG. 15, for example, there are some cases in which such a phenomenon noticeably arises that there occurs attenuation of signals written on one or more tracks adjacent to the track that is a target of writing or reading in a wide range along the direction of track width (The phenomenon will be hereinafter called wide-range adjacent track erase). One of possible reasons for the occurrence of the wide-range adjacent track erase in the shield-type head will now be described. The magnetic flux that has been generated from the end face of the pole layer 102 and has magnetized the recording medium returns to the shield layer 103. It is assumed that expansion of the magnetic flux that has been generated from the end face of the pole layer 102 and the magnetic flux returning to the shield layer 103 is one of the reasons for the wide-range adjacent track erase.

According to the magnetic head having the structure disclosed in U.S. Pat. No. 4,672,493, it is possible to increase components in the direction orthogonal to the surface of the recording medium among components of the magnetic field generated from the end of the middle magnetic layer closer to the medium facing surface. Therefore, it is assumed that it is thereby possible to suppress the wide-range adjacent track erase.

The magnetic head having the structure disclosed in U.S. Pat. No. 4,672,493 includes the two coils connected in series to each other. Such a magnetic head including two coils connected in series to each other will be hereinafter called a two-coil head. A magnetic head in which only one coil is provided will be hereinafter called a one-coil head. Problems of the two-coil head will now be described, comparing the one-coil head and the two-coil head with each other. To simplify the comparison between the one-coil head and the two-coil head, it is assumed that the two coils of the two-coil head and the one coil of the one-coil head are all equal in the number of turns and resistance.

In the two-coil head, currents of equal values are respectively fed to the two coils. To make the magnetomotive force of each of the coils of the two-coil head equal to that of the one coil of the one-coil head, it is necessary that the value of the current fed to each of the two coils of the two-coil head be equal to the value of the current fed to the one coil of the one-coil head. Then, the total of heating values of the two coils of the two-coil head is twice the heating value of the one coil of the one-coil head. Consequently, there arises a problem that the possibility of protrusion of a portion of the medium facing surface due to the heat generated by the coils of the two-coil head is greater, compared with the one-coil head.

Another problem of the two-coil head is that, since currents of equal values are respectively fed to the two coils, it is impossible to adjust the magnetomotive force of each of the coils by adjusting the value of the current for each of the coils.

OBJECTS AND SUMMARY OF THE INVENTION

It is a first object of the invention to provide a magnetic head for perpendicular magnetic recording comprising two coils provided to sandwich a pole layer, the head allowing adjustment of the value of a current for each of the coils.

In addition to the first object, it is a second object of the invention to provide a magnetic head for perpendicular magnetic recording capable of suppressing protrusion of a portion of the medium facing surface due to the heat produced by the two coils.

A magnetic head for perpendicular magnetic recording of the invention comprises: a medium facing surface that faces toward a recording medium; a first coil and a second coil for generating a magnetic field corresponding to data to be written on the recording medium; a pole layer having an end face located in the medium facing surface, allowing a magnetic flux corresponding to the field generated by the first and second coils to pass therethrough, and generating a write magnetic field for writing the data on the recording medium by means of a perpendicular magnetic recording system; a shield layer having an end face located in the medium facing surface and including a portion located away from the medium facing surface and coupled to the pole layer; and a gap layer made of a nonmagnetic material and provided between the pole layer and the shield layer.

In the medium facing surface, the end face of the shield layer is located forward of the end face of the pole layer along the direction of travel of the recording medium with a specific space created by the thickness of the gap layer. The first and second coils are located in regions sandwiching the pole layer and are electrically connected to each other in parallel. At least part of the second coil is located between the pole layer and the shield layer and insulated from the pole layer and the shield layer.

In the magnetic head for perpendicular magnetic recording of the invention, the first and second coils located in the regions sandwiching the pole layer are electrically connected to each other in parallel. As a result, according to the invention, it is possible to adjust the value of a current for each of the coils.

In the magnetic head of the invention, the first and second coils may have different resistances. In this case, the resistance of the second coil may be lower than that of the first coil. The first and second coils may be made of different materials having different resistivities.

In the magnetic head of the invention, the first and second coils may have equal resistances.

In the magnetic head of the invention, each of the first and second coils may be flat-whorl-shaped. In this case, each of the first and second coils may incorporate an inner connecting portion and an outer connecting portion opposite to the inner connecting portion; the direction of winding of the first coil from the outer connecting portion toward the inner connecting portion and the direction of winding of the second coil from the outer connecting portion toward the inner connecting portion may be opposite to each other; the inner connecting portion of the first coil may be electrically connected to the inner connecting portion of the second coil; and the outer connecting portion of the first coil may be electrically connected to the outer connecting portion of the second coil.

In the magnetic head for perpendicular magnetic recording of the invention, the first and second coils located in the regions sandwiching the pole layer are electrically connected to each other in parallel. As a result, according to the invention, it is possible to adjust the value of a current for each of the coils.

In the magnetic head of the invention, the resistance of the second coil may be lower than that of the first coil. In this case, if comparison is made with a case in which the first and second coils are connected in series while the current fed to the second coil is the same, the total heating value of the first and second coils is smaller, according to the invention. As a result, it is possible to suppress protrusion of a portion of the medium facing surface due to the heat generated by the two coils.

Other and further objects, features and advantages of the invention will appear more fully from the following description.

DETAILED DESCRIPTION OF THE PREFERRED EMBODIMENT

Figure 1:
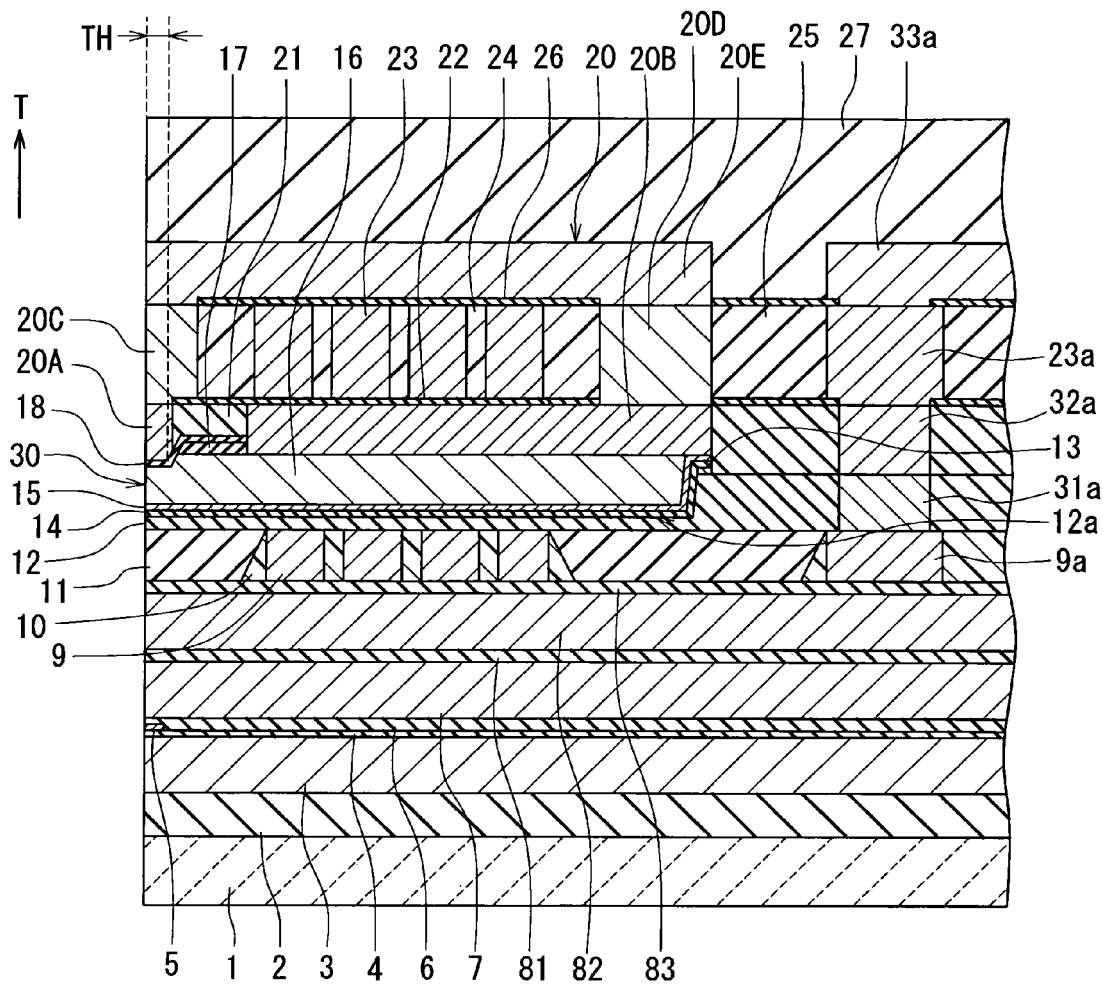
FIG. 1 is a cross-sectional view illustrating the configuration of a magnetic head of an embodiment of the invention.
Figure 2:
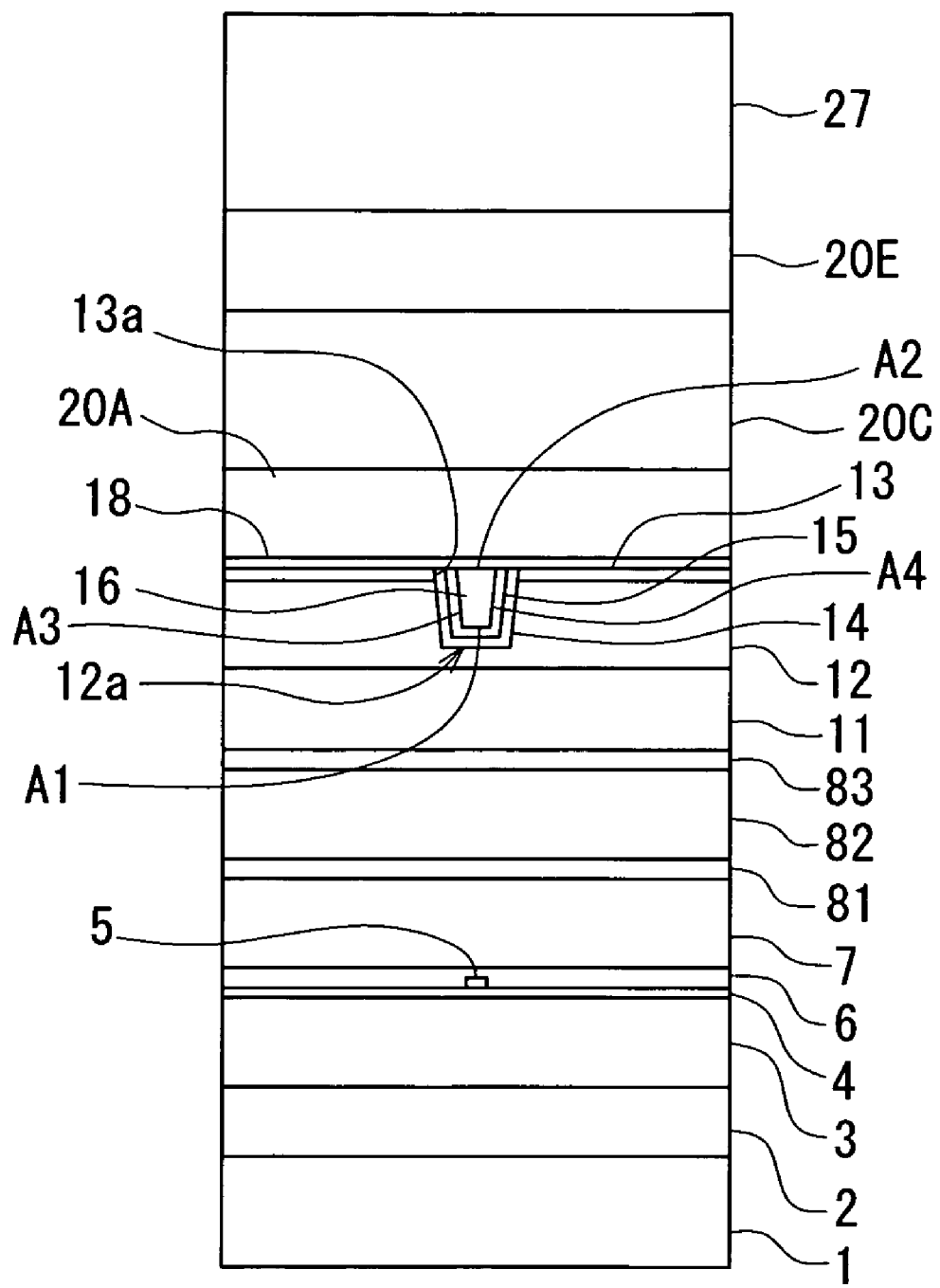
FIG. 2 is a front view of the medium facing surface of the magnetic head of the embodiment of the invention.
Figure 3:
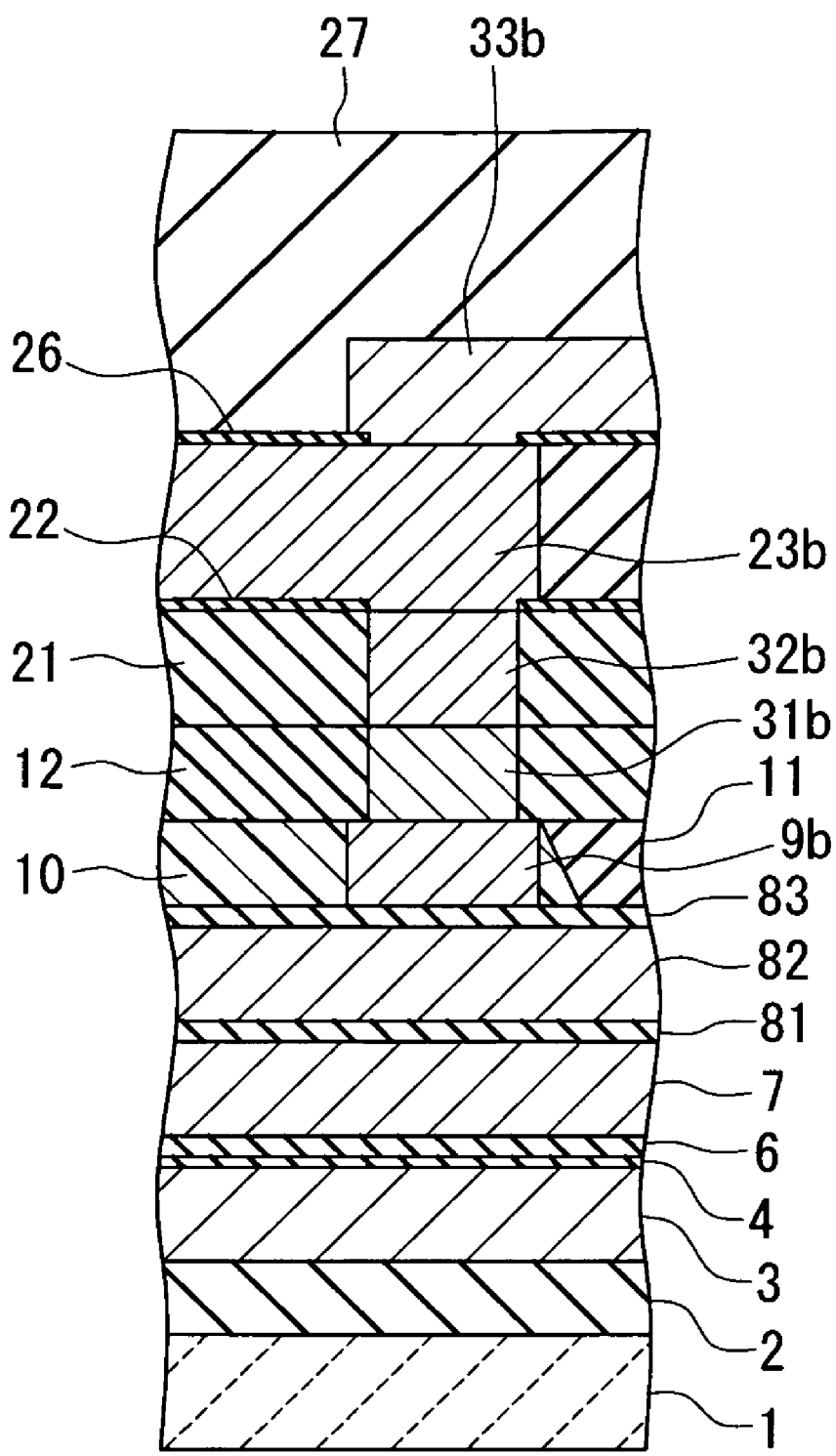
FIG. 3 is a cross-sectional view illustrating a neighborhood of outer connecting portions of two coils of the magnetic head of the embodiment of the invention.

A preferred embodiment of the invention will now be described in detail with reference to the accompanying drawings. Reference is now made to FIG. 1 to FIG. 3 to describe the configuration of a magnetic head for perpendicular magnetic recording of an embodiment of the invention. FIG. 1 is a cross-sectional view for illustrating the configuration of the magnetic head of the embodiment. FIG. 1 illustrates a cross section orthogonal to the medium facing surface and a surface of a substrate. The arrow indicated with T in FIG. 1 shows the direction of travel of a recording medium. FIG. 2 is a front view of the medium facing surface of the magnetic head of the embodiment. FIG. 3 is a cross-sectional view illustrating a neighborhood of outer connecting portions of two coils of the magnetic head of the embodiment.

As shown in FIG. 1 and FIG. 3, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a top shield layer 7 made of a magnetic material and disposed on the top shield gap film 6.

The MR element 5 has an end that is located in the medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element. The GMR element may be of a current-in-plane (CIP) type wherein a current used for detecting magnetic signals is fed in the direction nearly parallel to the plane of each layer making up the GMR element, or may be of a current-perpendicular-to-plane (CPP) type wherein a current used for detecting magnetic signals is fed in the direction nearly perpendicular to the plane of each layer making up the GMR element.

The magnetic head further comprises a nonmagnetic layer 81 and a middle magnetic layer 82 disposed one by one on the top shield layer 7. The nonmagnetic layer 81 is made of a nonmagnetic material such as alumina. The middle magnetic layer 82 is made of a magnetic material. The portions from the bottom shield layer 3 to the middle magnetic layer 82 make up a read head. The middle magnetic layer 82 has a function of a read shield layer and a function of an auxiliary pole of a write head that will be described later, that is, a function of returning a magnetic flux that has magnetized the recording medium.

The magnetic head further comprises: an insulating layer 83 made of an insulating material and disposed on the middle magnetic layer 82; a first coil 9 disposed on the insulating layer 83; an insulating layer 10 made of an insulating material and disposed around the coil 9 and in the space between the respective adjacent turns of the coil 9; and an insulating layer 11 made of an insulating material and disposed around the insulating layer 10. The coil 9 is flat-whorl-shaped. The coil 9 has an inner connecting portion 9a and an outer connecting portion 9b opposite to the inner connecting portion 9a. The connecting portions 9a and 9b are portions connected to a second coil described later. The inner connecting portion 9a is provided near an inner end of the winding of the coil 9 while the outer connecting portion 9b is provided near an outer end of the winding of the coil 9. The coil 9 and the insulating layers 10 and 11 have flattened top surfaces. The insulating layers 83 and 11 are made of alumina, for example. The insulating layer 10 is made of photoresist, for example. The coil 9 is made of a conductive material such as copper.

The magnetic head further comprises: a connecting layer 31a disposed on the inner connecting portion 9a of the coil 9; a connecting layer 31b disposed on the outer connecting portion 9b of the coil 9; and an encasing layer 12 made of a nonmagnetic material and disposed on the flattened top surfaces of the coil 9 and the insulating layers 10 and 11. The connecting layers 31a and 31b are made of a conductive material. The encasing layer 12 has a groove 12a that opens in the top surface thereof and that accommodates a pole layer described later. The encasing layer 12 may be made of an insulating material such as alumina, silicon oxynitride (SiON) or silicon oxide ($SiO_x$), or a nonmagnetic metal material such as Ru, Ta, Mo, Ti, W, NiCu, NiB or NiPd.

The magnetic head further comprises a connecting layer 32a disposed on the connecting layer 31a, and a connecting layer 32b disposed on the connecting layer 31b. The connecting layers 32a and 32b are made of a conductive material.

The magnetic head further comprises a nonmagnetic metal layer 13 made of a nonmagnetic metal material and disposed on the top surface of the encasing layer 12. The nonmagnetic metal layer 13 has an opening 13a that penetrates, and the edge of the opening 13a is located directly above the edge of the groove 12a in the top surface of the encasing layer 12. The nonmagnetic metal layer 13 may be made of any of Ta, Mo, W, Ti, Ru, Rh, Re, Pt, Pd, Ir, NiCr, NiP, NiPd, NiB, $WSi_2$, $TaSi_2$, $TiSi_2$, TiN, and TiW, for example.

The magnetic head further comprises a nonmagnetic film 14, a polishing stopper layer 15 and the pole layer 16 that are disposed in the groove 12a of the encasing layer 12 and in the opening 13a of the nonmagnetic metal layer 13. The nonmagnetic film 14 is disposed to touch the surface of the groove 12a. The pole layer 16 is disposed apart from the surface of the groove 12a. The polishing stopper layer 15 is disposed between the nonmagnetic film 14 and the pole layer 16.

The nonmagnetic film 14 is made of a nonmagnetic material. The material of the nonmagnetic film 14 may be an insulating material or a semiconductor material. The insulating material as the material of the nonmagnetic film 14 may be any of alumina, silicon oxide ($SiO_x$), and silicon oxynitride (SiON). The semiconductor material as the material of the nonmagnetic film 14 may be polycrystalline silicon or amorphous silicon.

The polishing stopper layer 15 is made of a nonmagnetic conductive material. The material of the polishing stopper layer 15 may be the same as that of the nonmagnetic metal layer 13.

The pole layer 16 is made of a magnetic metal material. The pole layer 16 may be made of any of CoFeN, CoNiFe, NiFe and CoFe, for example.

The magnetic head further comprises: a nonmagnetic film 17 made of a nonmagnetic material such as alumina and disposed on portions of the top surfaces of the polishing stopper layer 15 and the pole layer 16; and a gap layer 18 made of a nonmagnetic material and disposed on the nonmagnetic metal layer 13, the nonmagnetic film 14, the polishing stopper layer 15, the pole layer 16 and the nonmagnetic film 17. The gap layer 18 has an opening formed away from the medium facing surface 30. The material of the gap layer 18 may be an insulating material such as alumina or a nonmagnetic metal material such as Ru, NiCu, Ta, W, NiB or NiPd.

The magnetic head further comprises a shield layer 20. The shield layer 20 incorporates: a first layer 20A disposed on the gap layer 18; a second layer 20C disposed on the first layer 20A; a yoke layer 20B disposed on a region of the pole layer 16 where the opening of the gap layer 18 is formed; a coupling layer 20D disposed on the yoke layer 20B; and a third layer 20E disposed to couple the second layer 20C to the coupling layer 20D. Each of the first layer 20A, the yoke layer 20B, the second layer 20C, the coupling layer 20D and the third layer 20E is made of a magnetic material. Such a material may be any of CoFeN, CoNiFe, NiFe and CoFe, for example. The magnetic head further comprises a nonmagnetic layer 21 made of a nonmagnetic material and disposed around the first layer 20A and the yoke layer 20B.

The magnetic head further comprises: an insulating layer 22 disposed on regions of the top surfaces of the yoke layer 20B and the nonmagnetic layer 21 where a second coil 23 described later is disposed; the second coil 23 disposed on the insulating layer 22; an insulating layer 24 disposed around the coil 23 and in the space between the respective adjacent turns of the coil 23; an insulating layer 25 disposed around the insulating layer 24; and an insulating layer 26 disposed on the coil 23 and the insulating layers 24 and 25. The coil 23 is flat-whorl-shaped. The coil 23 has an inner connecting portion 23a and an outer connecting portion 23b opposite to the inner connecting portion 23a. The connecting portions 23a and 23b are portions connected to the connecting portions 9a and 9b of the first coil 9. The inner connecting portion 23a is provided near an inner end of the winding of the coil 23 while the outer connecting portion 23b is provided near an outer end of the winding of the coil 23. The inner connecting portion 23a is disposed on the connecting layer 32a. The outer connecting portion 23b is disposed on the connecting layer 32b. Part of the coil 23 passes between the second layer 20C and the coupling layer 20D. The coil 23 is made of a conductive material such as copper. The second layer 20C, the coupling layer 20D, the coil 23 and the insulating layers 24 and 25 have flattened top surfaces. The insulating layer 24 is made of photoresist, for example. The insulating layers 22, 25 and 26 are made of alumina, for example.

The magnetic head further comprises lead layers 33a and 33b disposed on the insulating layer 26. The insulating layer 26 has openings one of which is formed in a region on the inner connecting portion 23a of the coil 23 and the other of which is formed in a region on the outer connecting portion 23b of the coil 23. Through these openings, an end of the lead layer 33a is connected to the inner connecting portion 23a, and an end of the lead layer 33b is connected to the outer connecting portion 23b. The other end of each of the lead layers 33a and 33b is connected to terminals provided in the slider.

The portions from the middle magnetic layer 82 to the third layer 20E of the shield layer 20 make up the write head. The magnetic head further comprises a protection layer 27 disposed to cover the shield layer 20 and the lead layers 33a and 33b. The protection layer 27 is made of an inorganic insulating material such as alumina.

As described so far, the magnetic head of the embodiment comprises the medium facing surface 30 that faces toward a recording medium, the read head, and the write head. The read head and the write head are stacked on the substrate 1. The read head is located backward along the direction T of travel of the recording medium (that is, located closer to the air inflow end of the slider). The write head is located forward along the direction T of travel of the recording medium (that is, located closer to the air outflow end of the slider).

The read head comprises the MR element 5 as the read element, and the bottom shield layer 3 and the top shield layer 7 for shielding the MR element 5. Portions of the bottom shield layer 3 and the top shield layer 7 that are located on a side of the medium facing surface 30 are opposed to each other, the MR element 5 being placed between these portions. The read head further comprises: the bottom shield gap film 4 disposed between the MR element 5 and the bottom shield layer 3; and the top shield gap film 6 disposed between the MR element 5 and the top shield layer 7.

The write head comprises the first coil 9, the encasing layer 12, the nonmagnetic metal layer 13, the nonmagnetic film 14, the polishing stopper layer 15, the pole layer 16, the gap layer 18, the shield layer 20, and the second coil 23. The coils 9 and 23 generate a magnetic field corresponding to data to be written on the recording medium. The nonmagnetic film 14 may be omitted.

The pole layer 16 has an end face located in the medium facing surface 30. The pole layer 16 allows a magnetic flux corresponding to the field generated by the coils 9 and 23 to pass therethrough and generates a write magnetic field for writing the data on the medium by using the perpendicular magnetic recording system.

The shield layer 20 has an end face located in the medium facing surface 30, and has a portion located away from the medium facing surface 30 and coupled to the pole layer 16. The gap layer 18 is made of a nonmagnetic material and provided between the pole layer 16 and the shield layer 20.

In the medium facing surface 30, the end face of the shield layer 20 is disposed forward of the end face of the pole layer 16 along the direction T of travel of the recording medium with a specific space created by the thickness of the gap layer 18. The thickness of the gap layer 18 preferably falls within a range of 5 to 60 nm inclusive, and may be within a range of 30 to 60 nm inclusive, for example. At least part of the coil 23 is disposed between the pole layer 16 and the shield layer 20 and insulated from the pole layer 16 and the shield layer 20.

The pole layer 16 is disposed in the groove 12a of the encasing layer 12 and in the opening 13a of the nonmagnetic metal layer 13 with the nonmagnetic film 14 and the polishing stopper layer 15 disposed between the pole layer 16 and each of the groove 12a and the opening 13a. The nonmagnetic film 14 has a thickness that falls within a range of 10 to 40 nm inclusive, for example. However, the thickness of the nonmagnetic film 14 is not limited to this range but may be of any other value, depending on the track width. The polishing stopper layer 15 has a thickness that falls within a range of 30 to 100 nm inclusive, for example.

The pole layer 16 incorporates: a first portion having the end face located in the medium facing surface 30; and a second portion having a thickness greater than that of the first portion and disposed farther from the medium facing surface 30 than the first portion. The thickness of the first portion does not change according to the distance from the medium facing surface 30. The top surface of the first portion is located closer to the substrate 1 than the top surface of the second portion. As a result, the top surface of the pole layer 16 that touches the gap layer 18 bends. The difference in level created between the top surfaces of the first portion and the second portion falls within a range of 0.1 to 0.3 μm inclusive, for example. The thickness of the first portion falls within a range of 0.03 to 0.3 μm inclusive, for example.

The shield layer 20 has: the first layer 20A disposed adjacent to the gap layer 18; the second layer 20C disposed on a side of the first layer 20A farther from the gap layer 18; the yoke layer 20B disposed on the portion of the pole layer 16 where the opening of the gap layer 18 is formed; the coupling layer 20D disposed on the yoke layer 20B; and the third layer 20E disposed to couple the second layer 20C to the coupling layer 20D. The second layer 20C is disposed between the medium facing surface 30 and the at least part of the coil 23.

The bottom surface of the first layer 20A bends to be opposed to the top surface of the pole layer 16 with the gap layer 18 disposed in between. The gap layer 18 bends along the top surface of the pole layer 16, too. The width of the end face of the first layer 20A located in the medium facing surface 30 is equal to or greater than the track width.

The first layer 20A has: a first end located in the medium facing surface 30; and a second end opposite to the first end. The second layer 20C also has: a first end located in the medium facing surface 30; and a second end opposite to the first end. Throat height TH is the distance between the medium facing surface 30 and one of two points that is closer to the medium facing surface 30, wherein one of the two points is the one at which the space between the pole layer 16 and the shield layer 20 starts to increase when seen from the medium facing surface 30, and the other of the points is the one at which the gap layer 18 first bends when seen from the medium facing surface 30. In the embodiment, the throat height TH is the distance between the medium facing surface 30 and the point at which the gap layer 18 first bends when seen from the medium facing surface 30. The throat height TH falls within a range of 0.05 to 0.3 μm inclusive, for example. The minimum distance between the first end and the second end of the portion of the second layer 20C facing toward the pole layer 16 with the gap layer 18 and the first layer 20A disposed in between falls within a range of 0.3 to 0.8 μm inclusive, for example. The first layer 20A and the yoke layer 20B each have a thickness that falls within a range of 0.3 to 0.8 μm inclusive, for example. The second layer 20C and the coupling layer 20D each have a thickness that falls within a range of 1.5 to 3.0 μm inclusive, for example. The third layer 20E has a thickness that falls within a range of 2.0 to 3.0 μm inclusive, for example. The coil 23 has a thickness that is equal to or smaller than the thickness of the second layer 20C and that falls within a range of 1.5 to 3.0 μm inclusive, for example.

Figure 4:
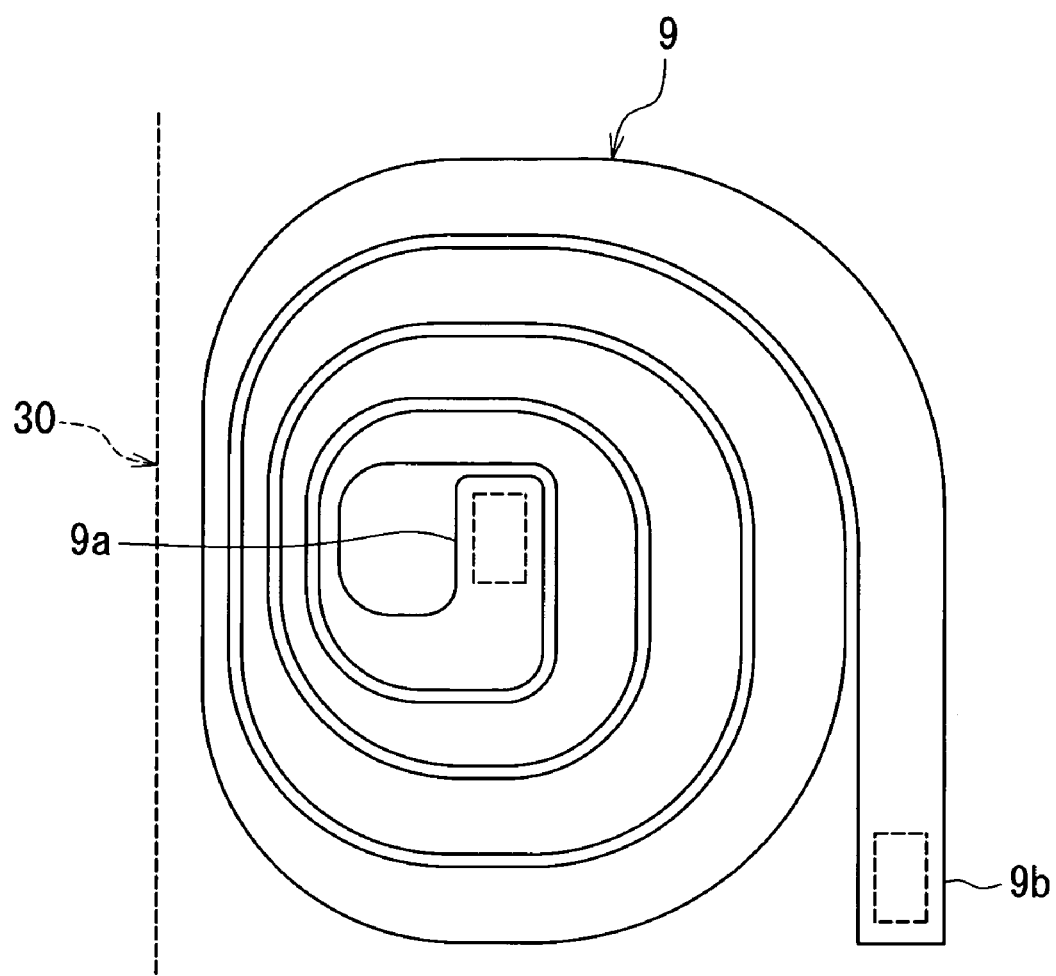
FIG. 4 is a top view of a first coil of the magnetic head of the embodiment of the invention.

Reference is now made to FIG. 4 to describe the shape of the first coil 9. FIG. 4 is a top view of the first coil 9. As shown in FIG. 4, the coil 9 is flat-whorl-shaped and has the inner connecting portion 9a and the outer connecting portion 9b. In the example shown in FIG. 4, the direction of winding of the first coil 9 from the outer connecting portion 9b toward the inner connecting portion 9a is counter-clockwise.

Figure 5:
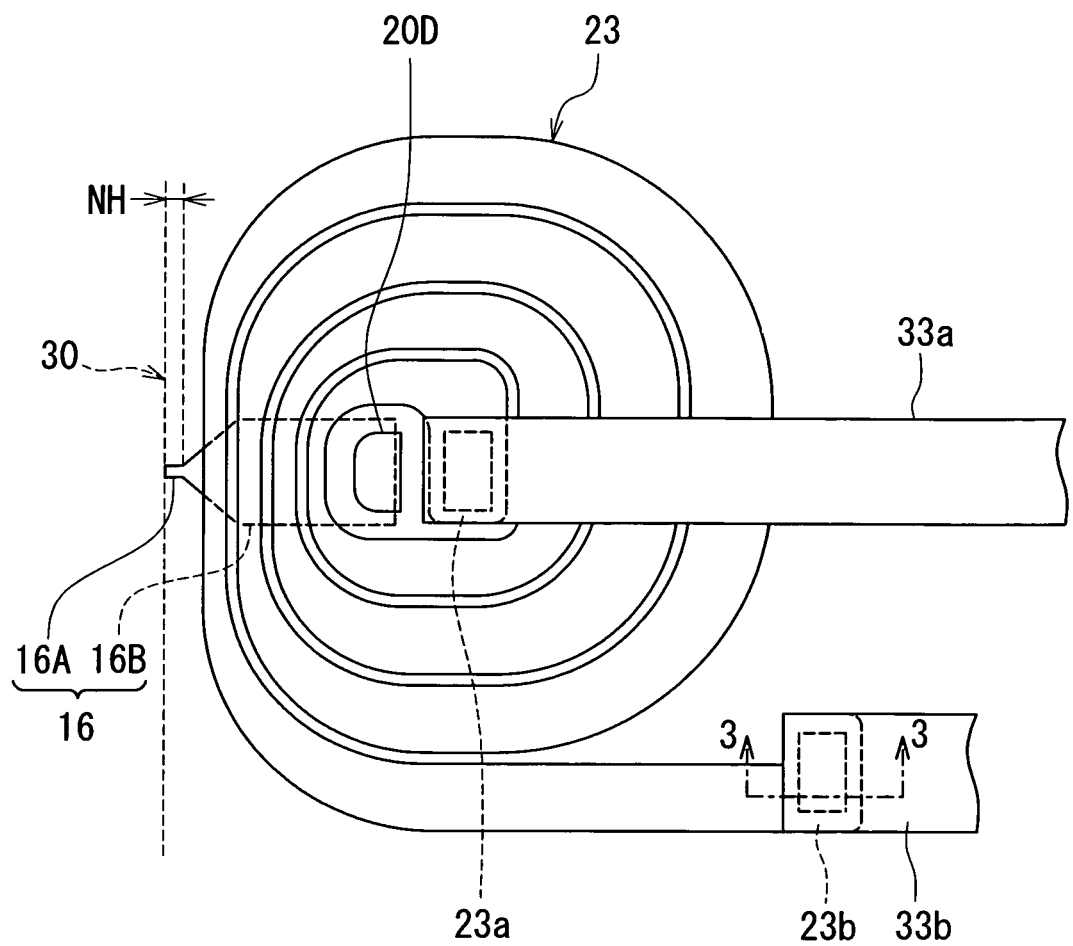
FIG. 5 is a top view of a second coil of the magnetic head of the embodiment of the invention.

Reference is now made to FIG. 5 to describe the shape of the second coil 23. FIG. 5 is a top view of the second coil 23. As shown in FIG. 5, the coil 23 is flat-whorl-shaped and has the inner connecting portion 23a and the outer connecting portion 23b. In the example shown in FIG. 5, the direction of winding of the second coil 23 from the outer connecting portion 23b toward the inner connecting portion 23a is clockwise. In the embodiment, as thus described, the direction of winding of the first coil 9 from the outer connecting portion 9b toward the inner connecting portion 9a and the direction of winding of the second coil 23 from the outer connecting portion 23b toward the inner connecting portion 23a are opposite to each other. The direction of winding of the first coil 9 and that of the second coil 23 may be the reverse of the examples shown in FIG. 4 and FIG. 5, respectively. FIG. 3 illustrates a cross section taken along line 3-3 of FIG. 5.

Figure 6:
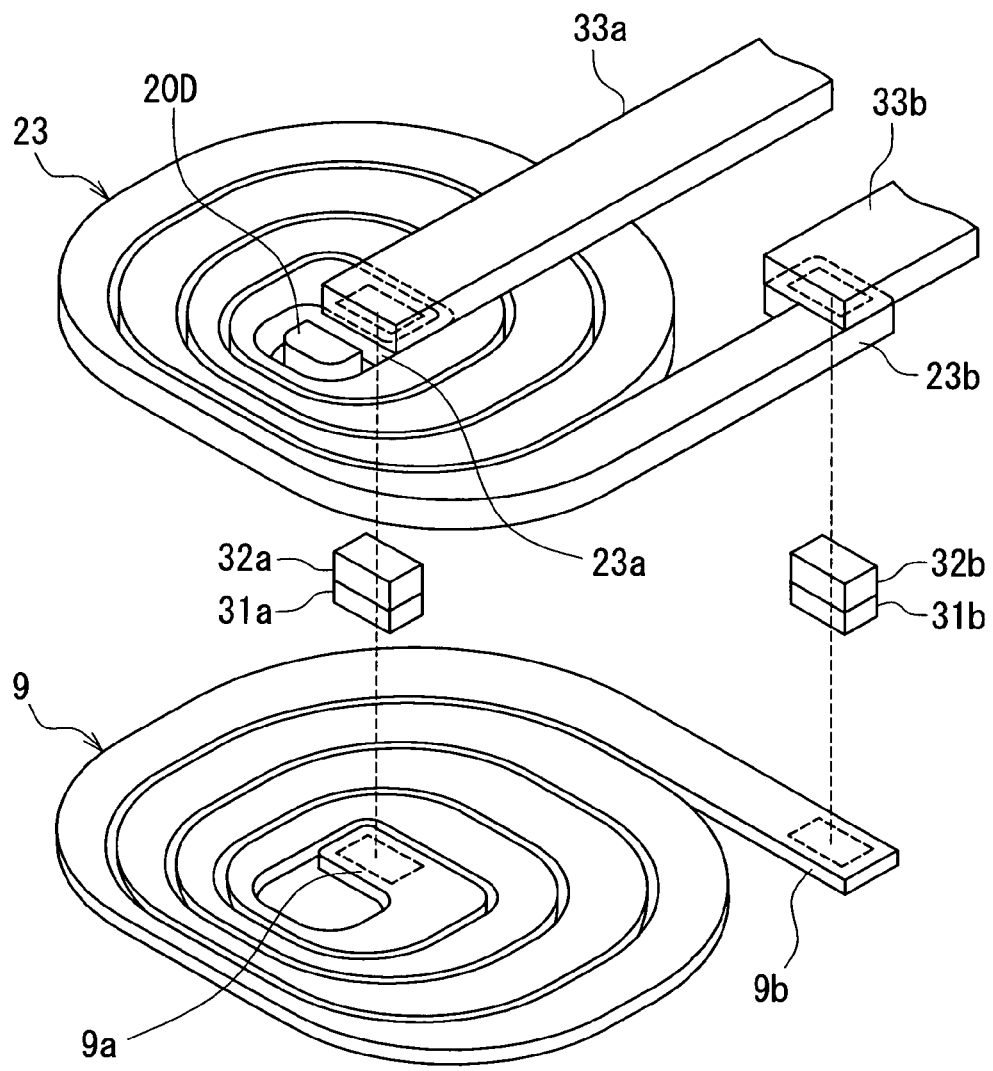
FIG. 6 is a perspective view illustrating the first and second coils of the magnetic head of the embodiment of the invention.

Reference is now made to FIG. 6 to describe the relationship of connection between the first coil 9 and the second coil 23. FIG. 6 is a perspective view illustrating the first coil 9 and the second coil 23. As shown in FIG. 6, the inner connecting portion 9a of the first coil 9 and the inner connecting portion 23a of the second coil 23 are electrically connected to each other through the connecting layers 31a and 32a. Similarly, the outer connecting portion 9b of the first coil 9 and the outer connecting portion 23b of the second coil 23 are electrically connected to each other through the connecting layers 31b and 32b. In this way, the coils 9 and 23 are electrically connected to each other in parallel. As shown in FIG. 1, the coils 9 and 23 are located in regions sandwiching the pole layer 16. At least part of the coil 23 is disposed between the pole layer 16 and the shield layer 20.

The coils 9 and 23 may have equal resistances or different resistances. The resistance of the coil 23 may be lower than that of the coil 9. The coils 9 and 23 may be made of the same material which may be Cu, for example, or may be made of different materials having different resistivities. For example, the coil 9 may be made of NiFe and the coil 23 may be made of Cu. The resistivity of NiFe is greater than that of Cu.

An end of the lead layer 33a is connected to the inner connecting portion 23a of the coil 23 while an end of the lead layer 33b is connected to the outer connecting portion 23b of the coil 23. A current corresponding to data to be written is fed to the coils 9 and 23 through these lead layers 33a and 33b. The coils 9 and 23 thereby generate a magnetic field corresponding to the data to be written. The pole layer 16 allows a magnetic flux corresponding to the field generated by the coils 9 and 23 to pass therethrough and generates a write magnetic field for writing the data on the medium by means of the perpendicular magnetic recording system. The direction of components of the write magnetic field resulting from the coil 9 coincides with the direction of components of the write magnetic field resulting from the coil 23. The middle magnetic layer 82 and the shield layer 20 have a function of returning a magnetic flux that has been generated from the end face of the pole layer 16 and has magnetized the recording medium. The middle magnetic layer 82 may have a portion that is located away from the medium facing surface 30 and coupled to the pole layer 16.

Reference is now made to FIG. 2 and FIG. 5 to describe the shape of the pole layer 16 in detail. As shown in FIG. 5, the pole layer 16 incorporates a track width defining portion 16A and a wide portion 16B. The track width defining portion 16A has the end face located in the medium facing surface 30. The wide portion 16B is located farther from the medium facing surface 30 than the track width defining portion 16A and has a width greater than the width of the track width defining portion 16A. The width of the track width defining portion 16A does not change in accordance with the distance from the medium facing surface 30. For example, the wide portion 16B is equal in width to the track width defining portion 16A at the boundary with the track width defining portion 16A, and gradually increases in width as the distance from the medium facing surface 30 increases and then maintains a specific width to the end of the wide portion 16B. In the embodiment the track width defining portion 16A is a portion of the pole layer 16 extending from the end face located in the medium facing surface 30 to the point at which the width of the pole layer 16 starts to increase. Here, the length of the track width defining portion 16A taken in the direction orthogonal to the medium facing surface 30 is called a neck height NH. The neck height NH falls within a range of 0.1 to 0.3 μm inclusive, for example.

As shown in FIG. 2, the end face of the pole layer 16 located in the medium facing surface 30 has: a first side A1 closest to the substrate 1; a second side A2 opposite to the first side A1; a third side A3 connecting an end of the first side A1 to an end of the second side A2; and a fourth side A4 connecting the other end of the first side A1 to the other end of the second side A2. The second side A2 defines the track width. The width of the end face of the pole layer 16 located in the medium facing surface 30 decreases as the distance from the first side A1 decreases. Each of the third side A3 and the fourth side A4 forms an angle that falls within a range of 5 to 15 degrees inclusive, for example, with respect to the direction orthogonal to the top surface of the substrate 1.

Reference is now made to FIG. 7A to FIG. 12A and FIG. 7B to FIG. 12B to describe a method of manufacturing the magnetic head of the embodiment. FIG. 7A to FIG. 12A are cross-sectional views of layered structures obtained in manufacturing process of the magnetic head orthogonal to the medium facing surface and the substrate. FIG. 7B to FIG. 12B show cross sections of portions of the layered structures near the medium facing surface, the cross sections being parallel to the medium facing surface. The portions closer to the substrate 1 than the insulating layer 83 are omitted in FIG. 7A to FIG. 12A and FIG. 7B to FIG. 12B.

According to the method of manufacturing the magnetic head of the embodiment, as shown in FIG. 1 and FIG. 2, the insulating layer 2, the bottom shield layer 3 and the bottom shield gap film 4 are first formed one by one on the substrate 1. Next, the MR element 5 and leads (not shown) connected to the MR element 5 are formed on the bottom shield gap film 4. Next, the top shield gap film 6 is formed to cover the MR element 5 and the leads. Next, the top shield layer 7, the nonmagnetic layer 81, the middle magnetic layer 82, and the insulating layer 83 are formed one by one on the top shield gap film 6. Next, the coil 9 and the insulating layers 10 and 11 are formed on the insulating layer 83. Next, the top surfaces of the coil 9 and the insulating layers 10 and 11 are flattened by chemical mechanical polishing (hereinafter referred to as CMP), for example.

Figure 7A:
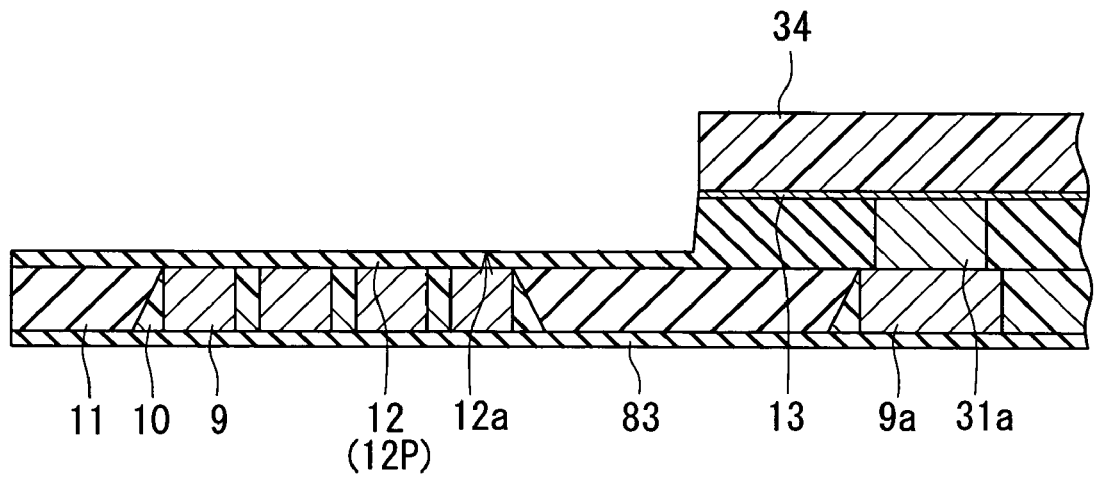
FIG. 7A and FIG. 7B are views for illustrating a step of a method of manufacturing the magnetic head of the embodiment of the invention.
Figure 7B:
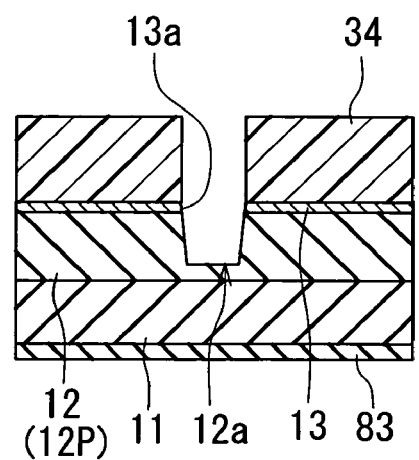

FIG. 7A and FIG. 7B illustrate the following step. In the step, first, the connecting layers 31a and 31b are respectively formed on the connecting portions 9a and 9b of the coil 9 by a method such as frame plating. Next, a nonmagnetic layer 12P is formed on the entire top surface of the layered structure. The groove 12a will be formed in the nonmagnetic layer 12P later and the nonmagnetic layer 12P will be thereby formed into the encasing layer 12. Next, the nonmagnetic layer 12P is polished by CMP, for example, until the connecting layers 31a and 31b are exposed, so as to flatten the top surfaces of the connecting layers 31a and 31b and the nonmagnetic layer 12P. Next, the nonmagnetic metal layer 13 made of a nonmagnetic metal material is formed by sputtering, for example, on the nonmagnetic layer 12P. The nonmagnetic metal layer 13 has a thickness that falls within a range of 20 to 100 nm inclusive, for example.

Next, a photoresist layer having a thickness of 1.0 μm, for example, is formed on the nonmagnetic metal layer 13. The photoresist layer is then patterned to form a mask 34 for making the groove 12a of the encasing layer 12. The mask 34 has an opening having a shape corresponding to the groove 12a.

Next, the nonmagnetic metal layer 13 is selectively etched using the mask 34. The opening 13a that penetrates is thereby formed in the nonmagnetic metal layer 13. The opening 13a has a shape corresponding to the plane geometry of the pole layer 16 to be formed later. Furthermore, a portion of the nonmagnetic layer 12P exposed from the opening 13a of the nonmagnetic metal layer 13 is selectively etched so as to form the groove 12a in the nonmagnetic layer 12P. The mask 34 is then removed. The nonmagnetic layer 12P is formed into the encasing layer 12 by forming the groove 12a therein. The edge of the opening 13a of the nonmagnetic metal layer 13 is located directly above the edge of the groove 12a located in the top surface of the encasing layer 12.

The etching of each of the nonmagnetic metal layer 13 and the nonmagnetic layer 12P is performed by reactive ion etching or ion beam etching, for example. The etching for forming the groove 12a in the nonmagnetic layer 12P is performed such that the walls of the groove 12a corresponding to both sides of the track width defining portion 16A of the pole layer 16 each form an angle that falls within a range of 5 to 15 degrees inclusive, for example, with respect to the direction orthogonal to the top surface of the substrate 1.

Figure 8A:
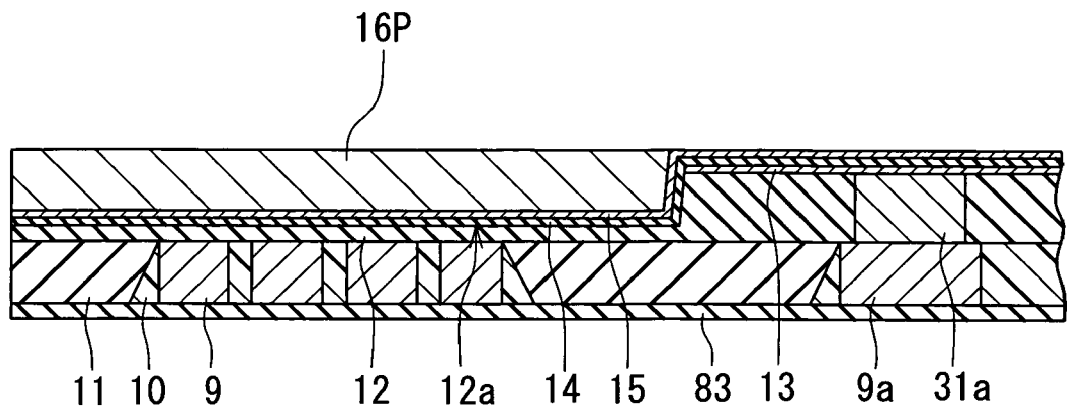
FIG. 8A and FIG. 8B are views for illustrating a step that follows the step shown in FIG. 7A and FIG. 7B.
Figure 8B:
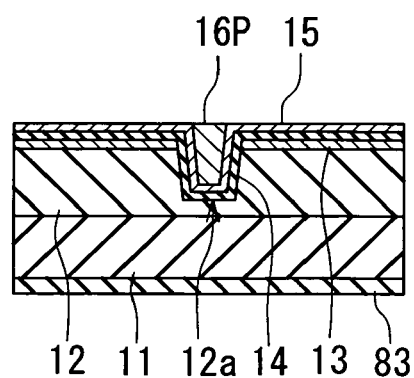

FIG. 8A and FIG. 8B illustrate the following step. In the step, first, the nonmagnetic film 14 is formed on the entire top surface of the layered structure. The nonmagnetic film 14 is formed in the groove 12a of the encasing layer 12, too. The nonmagnetic film 14 is formed by sputtering or chemical vapor deposition (hereinafter referred to as CVD), for example. It is possible to control the thickness of the nonmagnetic film 14 with precision. If the nonmagnetic film 14 is formed by CVD, it is preferred to employ a method called 'atomic layer CVD' (ALCVD) in which formation of a single atomic layer is repeated. In this case, it is possible to control the thickness of the nonmagnetic film 14 with higher precision. When ALCVD is employed to form the nonmagnetic film 14, it is preferred to use alumina, in particular, as the material of the nonmagnetic film 14. If a semiconductor material is used to form the nonmagnetic film 14, it is preferred to form the nonmagnetic film 14 by ALCVD at a low temperature (around 200° C.) or by low-pressure CVD at a low temperature. The semiconductor material as the material of the nonmagnetic film 14 is preferably undoped polycrystalline silicon or amorphous silicon.

Next, the polishing stopper layer 15 is formed on the entire top surface of the layered structure by sputtering or ALCVD, for example. The polishing stopper layer 15 is formed in the groove 12a of the encasing layer 12, too. The polishing stopper layer 15 indicates the level at which polishing of the polishing step to be performed later is stopped.

Next, a magnetic layer 16P to be the pole layer 16 is formed in the groove 12a of the encasing layer 12 in a manner that will now be described, for example. In the step, first, a first magnetic film to be an electrode for plating is formed on the entire top surface of the layered structure. The first magnetic film is formed by sputtering or ion beam deposition, for example. If the first magnetic film is formed by sputtering, it is preferred to employ collimation sputtering or long throw sputtering.

Next, a second magnetic film is formed on the first magnetic film. The second magnetic film is formed such that the top surface thereof is located higher than the top surfaces of the nonmagnetic metal layer 13, the nonmagnetic film 14 and the polishing stopper layer 15. The second magnetic film is formed by frame plating, for example. Alternatively, the second magnetic film may be formed by forming a plating film unpatterned and then patterning this plating film through etching. The magnetic layer 16P is formed of the first and second magnetic films. It is not always necessary to provide the first magnetic film since the polishing stopper layer 15 may be used as an electrode for plating.

Next, a coating layer not shown made of alumina, for example, and having a thickness of 0.5 to 1.2 μm, for example, is formed on the entire top surface of the layered structure. Next, the coating layer and the magnetic layer 16P are polished by CMP, for example, so that the polishing stopper layer 15 is exposed, and the top surfaces of the polishing stopper layer 15 and the magnetic layer 16P are thereby flattened. If the coating layer and the magnetic layer 16P are polished by CMP, such a slurry is used that polishing is stopped when the polishing stopper layer 15 is exposed, such as an alumina-base slurry.

Figure 9A:
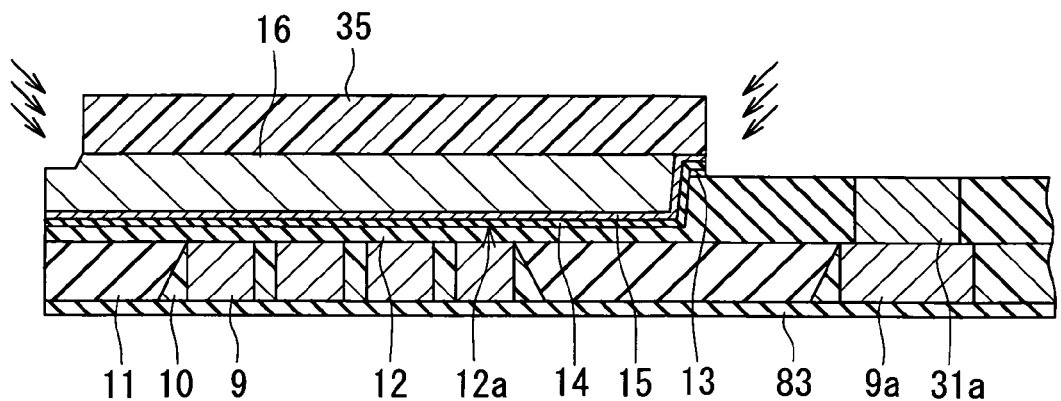
FIG. 9A and FIG. 9B are views for illustrating a step that follows the step shown in FIG. 8A and FIG. 8B.
Figure 9B:
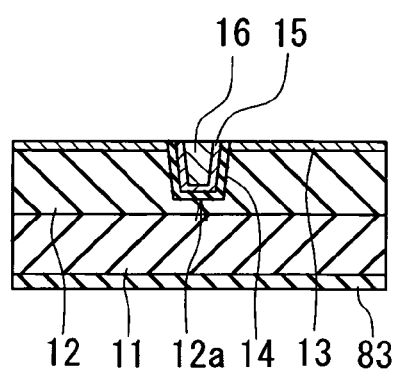

FIG. 9A and FIG. 9B illustrate the following step. In the step, first, a photoresist layer having a thickness of 1.0 μm, for example, is formed on the entire top surface of the layered structure. The photoresist layer is then patterned to form a mask 35 for etching a portion of the magnetic layer 16P. The mask 35 covers the top surface of the magnetic layer 16P except the region in which the top surface of the first portion of the pole layer 16 will be formed. Next, the portion of the magnetic layer 16P is etched by ion beam etching, for example, using the mask 35. As a result, the top surface of the first portion of the pole layer 16 is formed at the top surface of the magnetic layer 16P, and the magnetic layer 16P is thereby formed into the pole layer 16. This etching is performed such that the second side A2 of the end face of the pole layer 16 located in the medium facing surface 30 is disposed at a height that falls within the range between the height at which the top surface of the nonmagnetic metal layer 13 as initially formed is located and the height at which the bottom surface thereof is located. Therefore, the nonmagnetic metal layer 13 serves as the reference that indicates the level at which this etching is stopped. The portion of the magnetic layer 16P is etched in the manner thus described, so that each of the track width and the thickness of the pole layer 16 taken in the medium facing surface 30 is controlled to be nearly uniform. It is thereby possible to control the thickness of the pole layer 16 and the track width with precision. If the nonmagnetic metal layer 13 has a relatively great thickness within the above-mentioned range, in particular, it is preferred that the inner wall of the opening 13a is orthogonal to the top surface of the substrate 1. Next, the mask 35 is removed. When the above-mentioned etching is performed, the polishing stopper layer 15, the nonmagnetic film 14 and the nonmagnetic metal layer 13 are etched at the same time, so that the top surfaces of the connecting layers 31a and 31b are exposed.

Figure 10A:
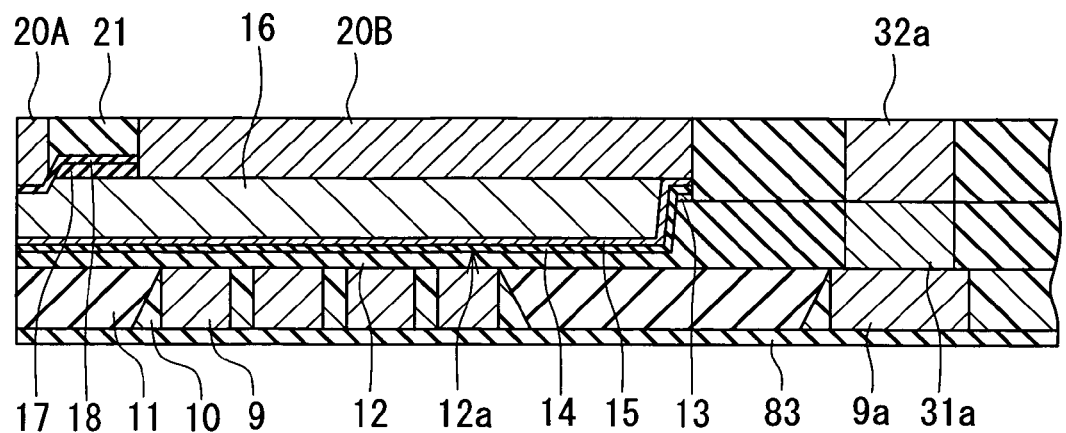
FIG. 10A and FIG. 10B are views for illustrating a step that follows the step shown in FIG. 9A and FIG. 9B.
Figure 10B:
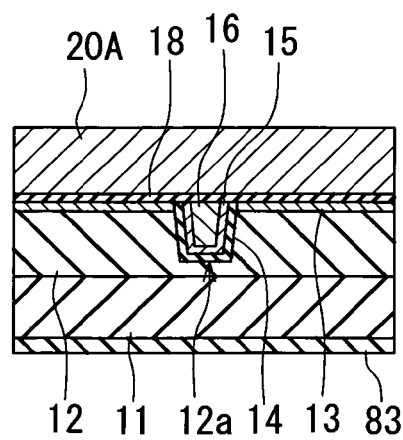

FIG. 10A and FIG. 10B illustrate the following step. In the step, first, the nonmagnetic film 17 is formed on the entire top surface of the layered structure. Next, a portion of the nonmagnetic film 17 is etched to pattern the nonmagnetic film 17. Next, the gap layer 18 is formed on the entire top surface of the layered structure. The gap layer 18 is formed by sputtering or CVD, for example. If the gap layer 18 is formed by CVD, it is preferred to employ ALCVD. When ALCVD is employed to form the gap layer 18, it is preferred to use alumina, in particular, as the material of the gap layer 18. The gap layer 18 formed by ALCVD exhibits a good step coverage. Thus, by employing ALCVD to form the gap layer 18, it is possible to form the gap layer 18 to be uniform on the uneven surface. Next, a portion of the gap layer 18 is etched to pattern the gap layer 18.

Next, the first layer 20A is formed on the gap layer 18, and the yoke layer 20B is formed on a portion of the pole layer 16 where the opening of the gap layer 18 is formed. The first layer 20A and the yoke layer 20B may be formed by frame plating or by making a magnetic layer through sputtering and then selectively etching the magnetic layer. Furthermore, the connecting layers 32a and 32b are formed on the connecting layers 31a and 31b, respectively, by frame plating, for example. Either of formation of the connecting layers 31a and 31b and formation of the first layer 20A and the yoke layer 20B may be performed first. Alternatively, the first layer 20A, the yoke layer 20B, and the connecting layers 31a and 31b may be formed at the same time by using the same material.

Next, the nonmagnetic layer 21 is formed on the entire top surface of the layered structure. Next, the nonmagnetic layer 21 is polished by CMP, for example, so that the first layer 20A, the yoke layer 20B, and the connecting layers 32a and 32b are exposed, and the top surfaces of the first layer 20A, the yoke layer 20B, the connecting layers 32a and 32b, and the nonmagnetic layer 21 are flattened.

Figure 11A:
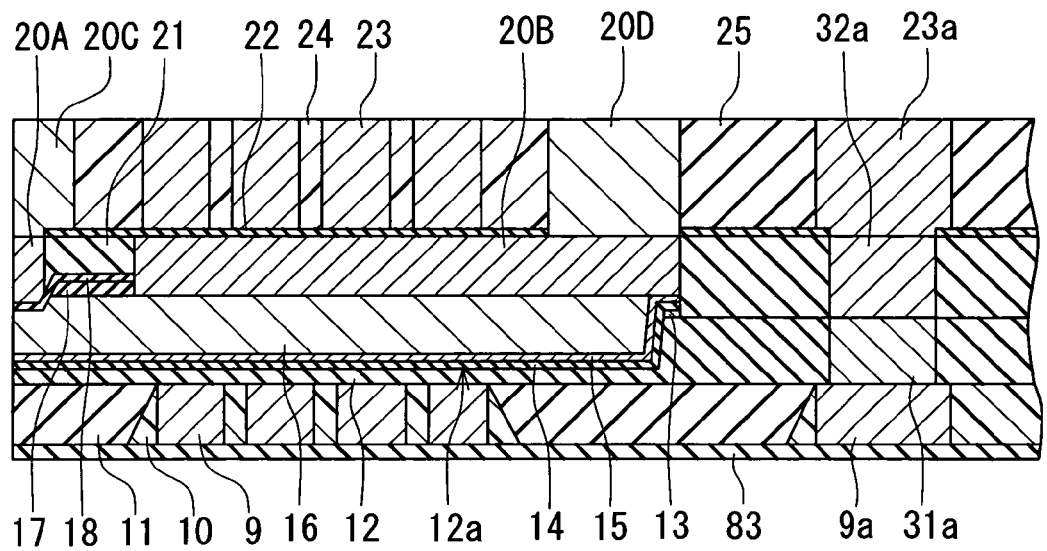
FIG. 11A and FIG. 11B are views for illustrating a step that follows the step shown in FIG. 10A and FIG. 10B.
Figure 11B:
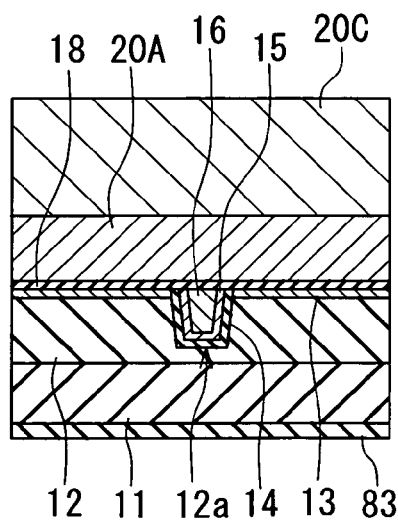

FIG. 11A and FIG. 11B illustrate the following step. In the step, first, the insulating layer 22 is formed on regions of the top surfaces of the yoke layer 20B and the nonmagnetic layer 21 in which the coil 23 will be disposed. The insulating layer 22 is formed so as not to cover the top surfaces of the connecting layers 32a and 32b. Next, the coil 23 is formed by frame plating, for example, such that at least part of the coil 23 is disposed on the insulating layer 22. At this time, the connecting portions 23a and 23b of the coil 23 are located on the top surfaces of the connecting layers 32a and 32b and connected to the connecting layers 32a and 32b. Next, the second layer 20C and the coupling layer 20D are formed by frame plating, for example. Alternatively, the coil 23 may be formed after the second layer 20C and the coupling layer 20D are formed.

Next, the insulating layer 24 made of photoresist, for example, is selectively formed around the coil 23 and in the space between the respective adjacent turns of the coil 23. Next, the insulating layer 25 is formed on the entire top surface of the layered structure. Next, the insulating layer 25 is polished by CMP, for example, so that the second layer 20C, the coupling layer 20D and the coil 23 are exposed, and the top surfaces of the second layer 20C, the coupling layer 20D, the coil 23 and the insulating layers 24 and 25 are thereby flattened.

Figure 12A:
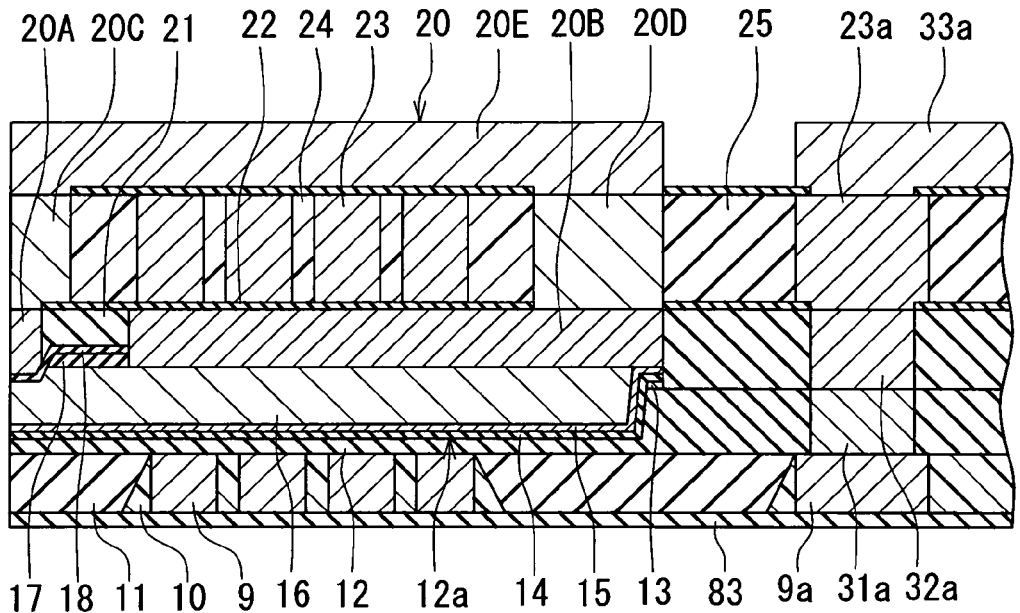
FIG. 12A and FIG. 12B are views for illustrating a step that follows the step shown in FIG. 11A and FIG. 11B.
Figure 12B:
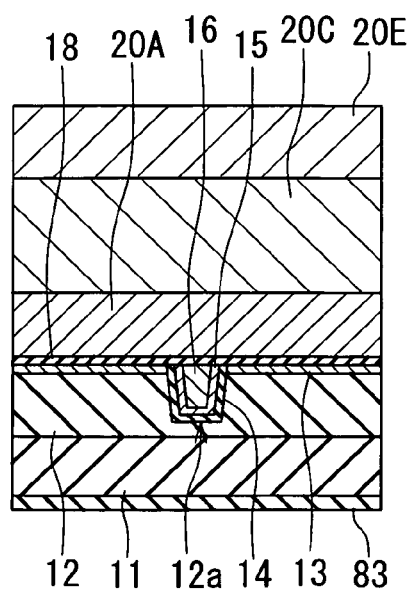

FIG. 12A and FIG. 12B illustrate the following step. In the step, first, the insulating layer 26 is formed on the coil 23 and the insulating layers 24 and 25. The insulating layer 26 is formed so as not to cover the top surfaces of the connecting portions 23a and 23b of the coil 23. Next, the third layer 20E is formed by frame plating, for example, to complete the shield layer 20. Furthermore, the lead layers 33a and 33b are formed by frame plating, for example, so as to be connected to the connecting portions 23a and 23b, respectively. Either of formation the third layer 20E and formation of the lead layers 33a and 33b may be performed first. Alternatively, the third layer 20E and the lead layers 33a and 33b may be formed at the same time by using the same material.

Next, the protection layer 27 is formed to cover the entire top surface of the layered structure. Wiring and terminals and so on are then formed on the protection layer 27, the substrate is cut into sliders, and the steps including polishing of the medium facing surface 30 and fabrication of flying rails are performed. The magnetic head is thus completed.

The operation and effects of the magnetic head of the embodiment will now be described. The magnetic head writes data on a recording medium by using the write head and reads data written on the recording medium by using the read head. In the write head the coils 9 and 23 generate a magnetic field that corresponds to the data to be written on the medium. The pole layer 16 and the shield layer 20 form a magnetic path through which a magnetic flux corresponding to the magnetic field generated by the coils 9 and 23 passes. The pole layer 16 allows the flux corresponding to the field generated by the coils 9 and 23 to pass and generates a write magnetic field used for writing the data on the medium by means of the perpendicular magnetic recording system.

The shield layer 20 takes in a disturbance magnetic field applied from outside the magnetic head to the magnetic head. It is thereby possible to prevent erroneous writing on the recording medium caused by the disturbance magnetic field intensively taken in into the pole layer 16.

According to the embodiment, in the medium facing surface 30, the end face of the shield layer 20 is disposed forward of the end face of the pole layer 16 along the direction T of travel of the recording medium (that is, disposed closer to the air outflow end of the slider) with a specific small space created by the gap layer 18. The location of an end of the bit pattern written on the recording medium is determined by the location of the end of the pole layer 16 that is closer to the gap layer 18 and located in the medium facing surface 30. In a region forward of the end face of the pole layer 16 along the direction T of travel of the recording medium, the shield layer 20 takes in a magnetic flux that is generated from the end face of the pole layer 16 located in the medium facing surface 30 and that extends in directions except the direction orthogonal to the surface of the recording medium so as to prevent the flux from reaching the recording medium. It is thereby possible to prevent a direction of magnetization of the bit pattern already written on the medium from being changed due to the effect of the above-mentioned flux. According to the embodiment, an improvement in linear recording density is thus achieved. In addition, the shield layer 20 has a function of returning a magnetic flux that has been generated from the end face of the pole layer 16 and has magnetized the recording medium.

The middle magnetic layer 82 has a function of returning a magnetic flux that has been generated from the end face of the pole layer 16 and has magnetized the recording medium, too. In a region backward of the end face of the pole layer 16 along the direction T of travel of the recording medium, the middle magnetic layer 82 and the coil 9 take in a magnetic flux that is generated from the end face of the pole layer 16 located in the medium facing surface 30 and that extends in directions other than the direction orthogonal to the surface of the recording medium, so that the flux reaching the recording medium is suppressed.

As thus described, according to the embodiment, it is possible to suppress expansion of the magnetic flux in the regions both forward and backward of the end face of the pole layer 16 along the direction T of travel of the recording medium and to suppress leakage flux reaching the recording medium. It is thereby possible to suppress the wide-range adjacent track erase.

According to the embodiment, as shown in FIG. 2, the width of the end face of the pole layer 16 located in the medium facing surface 30 decreases as the distance from the first side A1 decreases. It is thereby possible to prevent the problems resulting from the skew.

According to the embodiment, the pole layer 16 is disposed in the groove 12a of the encasing layer 12 made of a nonmagnetic material with the nonmagnetic film 14 and the polishing stopper layer 15 disposed between the pole layer 16 and the groove 12a. Consequently, the pole layer 16 is smaller than the groove 12a in width. It is thereby possible to easily form the groove 12a and to easily reduce the width of the pole layer 16 and the width of the top surface of the track width defining portion 16A that defines the track width, in particular. As a result, according to the embodiment, it is possible to easily implement the track width that is smaller than the minimum track width that can be formed by photolithography and to control the track width with accuracy.

According to the embodiment, the coils 9 and 23 placed in regions sandwiching the pole layer 16 are electrically connected to each other in parallel. It is thereby possible to adjust the value of current for each of the coils 9 and 23.

In the embodiment, the coils 9 and 23 may have different resistances. It is thereby possible to allow the values of currents fed to the coils 9 and 23 to be different from each other. Methods for allowing the resistances of the coils 9 and 23 to be different from each other include making the cross-sectional areas and/or the lengths of windings of the coils 9 and 23 different, making the coils 9 and 23 using different materials having different resistivities, and a combination of these.

Here is an example of dimensions of cross sections of the coils 9 and 23 and the ratio between resistances of the coils 9 and 23 employable in a case where the resistance of the coil 23 is made lower than that of the coil 9. In this example the coils 9 and 23 are made of the same material. In the example a cross section of a portion of winding of the coil 9 that is smallest in width has a shape of rectangle that is 0.7 μm wide and 1.0 μm high. In the example a cross section of a portion of winding of the coil 23 that is smallest in width has a shape of rectangle that is 1.3 μm wide and 2.0 μm high. It should be noted that the resistance of each of the coils 9 and 23 depends on not only the shape of the above-mentioned cross section but also factors such as the length of winding and the shapes of cross sections of portions other than the portion that is smallest in width. In the example it is defined that the resistance of the coil 23 is one third of the resistance of the coil 9. In this case, the value of current fed to the coil 23 is three times the value of current fed to the coil 9.

In the embodiment the coils 9 and 23 may have equal resistances. In this case, it is possible that the cross-sectional areas and the lengths of windings of the coils 9 and 23 are made equal and that the coils 9 and 23 are made of the same material.

In the embodiment, in particular, it is preferred that the resistance of the coil 23 be lower than that of the coil 9. This is because a write magnetic field generated from the pole layer 16 is mainly based on a magnetic field generated by the coil 23. In contrast, the major function of the coil 9 is to suppress expansion of a magnetic flux in a region backward of the end face of the pole layer 16 along the direction T of travel of the recording medium and also to suppress leakage flux reaching the recording medium in that region. Therefore, the magnetomotive force of the coil 9 can be smaller than that of the coil 23. If the resistance of the coil 23 is lower than that of the coil 9, the value of current fed to the coil 23 is greater than the value of current fed to the coil 9. It is thereby possible to reduce the current fed to the coil 9 and to reduce the magnetomotive force of the coil 9 while feeding the coil 23 a current required for generating a sufficient write magnetic field.

According to the embodiment, if comparison is made under the assumption that the magnetomotive force of the coil 23 is fixed, making the resistance of the coil 23 lower than that of the coil 9 allows the total of heating values of the two coils 9 and 23 to be smaller than in a case in which the coils 9 and 23 are connected in series. As a result, according to the embodiment, it is possible to suppress protrusion of a portion of the medium facing surface 30 due to the heat generated by the two coils 9 and 23. This feature will now be described in detail, referring to FIG. 13 and FIG. 14.

Figure 13:
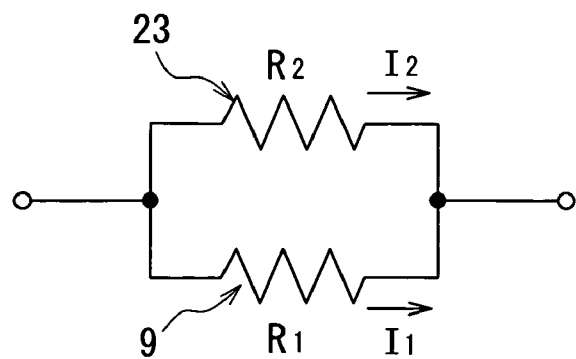
FIG. 13 is a schematic diagram illustrating an equivalent circuit of the two coils of the embodiment.
Figure 14:
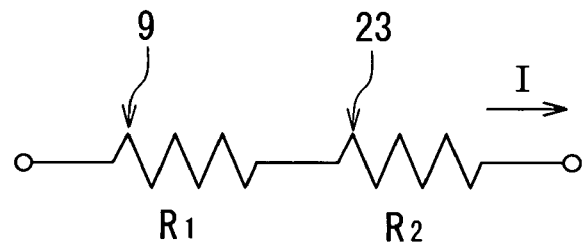
FIG. 14 is a schematic diagram illustrating an equivalent circuit of two coils of a comparative example.
Figure 15:
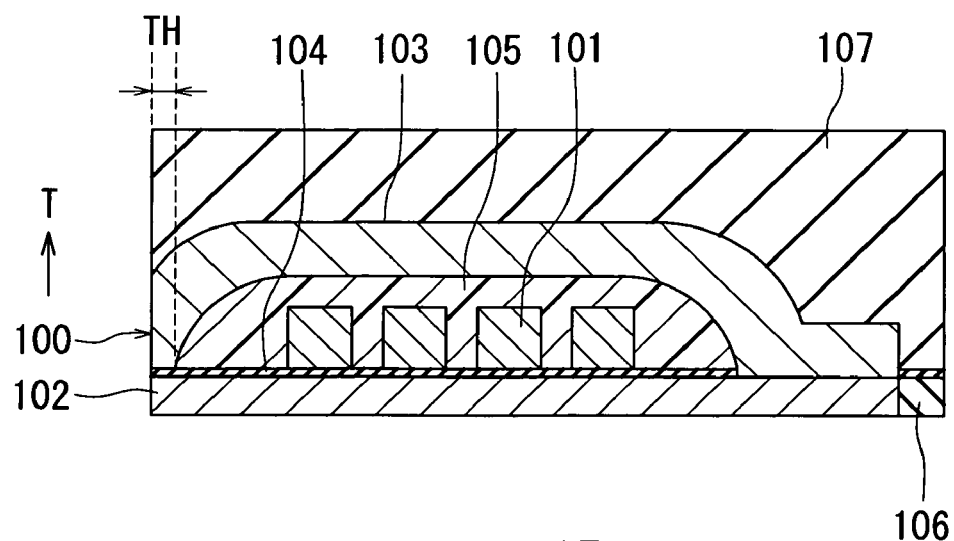
FIG. 15 is a cross-sectional view illustrating a main part of an example of the shield-type head.

FIG. 13 is a schematic diagram illustrating an equivalent circuit of the coils 9 and 23 of the embodiment. FIG. 14 is a schematic diagram illustrating an equivalent circuit of the coils 9 and 23 of a comparative example. The coils 9 and 23 are connected in parallel in the embodiment while the coils 9 and 23 are connected in series in the comparative example. Here, the resistance of the coil 9 is defined as $R_1$ and the resistance of the coil 23 is defined as $R_2$ for each of the embodiment and the comparative example. For the embodiment, the value of the current fed to the coil 9 is defined as $I_1$ and the value of the current fed to the coil 23 is defined as 12. For the comparative example, the value of the current fed to the coils 9 and 23 is I. Here, it is assumed that the values of currents fed to the coils 23 of the embodiment and the comparative example are equal so that comparison be made under the condition that the magnetomotive forces of the coils 23 are equal. That is, it is assumed here that $I_2=I$.

The heating values per unit time of the coils 9 and 23 of the embodiment are defined as $Q_{1p}$ and $Q_{2p}$, respectively. The total heating value per unit time of the coils 9 and 23 of the embodiment is defined as Qp. The heating values per unit time of the coils 9 and 23 of the comparative example are defined as $Q_{1s}$ and $Q_{2s}$, respectively. The total heating value per unit time of the coils 9 and 23 of the comparative example is defined as Qs. The heating values are exporessed as below, according to Joule's law.

$Q_{1p}=I_1^2 R_1$ $Q_{2p}=I_2^2 R_2=I^2 R_2$ $Qp=Q_{1p}+Q_{2p}=I_1^2 R_1+I^2 R_2$ $Q_{1s}=I^2 R_1$ $Q_{2s}=I^2 R_2$ $Qs=Q_{1s}+Q_{2s}=I^2 R_1+I^2 R_2$

Consequently, the difference Qp−Qs between the heating value Qp of the embodiment and the heating value Qs of the comparative example is expressed by the equation (1) below.

$$Qp-Qs=I_1^2 R_1-I^2 R_1 \tag{1}$$

Here, the equation $I_1 R_1 = IR_2$ holds for the embodiment since the voltage across the coil 9 and the voltage across the coil 23 are equal. The equation $I_1=IR_2/R_1$ is thereby obtained. Substituting this equation into the equation (1) yields the equation (2) below.

$$Q_p - Q_s = I^2 R_2^2 / R_1 - I^2 R_1 \tag{2}$$
$$= I^2 (R_2^2 - R_1^2)/R_1$$

The equation (2) teaches that when $R_1>R_2$ holds, it holds that Qp−Qs <0. That is, according to the embodiment, if comparison is made under the condition that the magnetomotive force of the coil 23 is fixed, making the resistance $R_2$ of the coil 23 lower than the resistance $R_1$ of the coil 9 makes the total of heating values of the two coils 9 and 23 smaller than in the case in which the coils 9 and 23 are connected in series.

Comparison is now made between the embodiment and the comparative example with regard to the total of heating values of the coils 9 and 23 under the condition that the current fed to the entire coils 9 and 23 is fixed. Here, for the embodiment, the sum of the value of current $I_1$ fed to the coil 9 and the value of current $I_2$ fed to the coil 23 is defined as I. The value of combined resistance of the coils 9 and 23 of the embodiment is defined as R, and the value of voltage across the coils 9 and 23 is defined as V. In this case, R and V are expressed by the equations below.

$$R = R_1 R_2/(R_1+R_2)$$

$$V = IR = IR_1 R_2/(R_1+R_2)$$

Consequently, the value of current $I_1$ fed to the coil 9 and the value of current $I_2$ fed to the coil 23 of the embodiment are expressed by the equations below.

$$I_1 = V/R_1 = IR_2/(R_1+R_2)$$

$$I_2 = V/R_2 = IR_1/(R_1+R_2)$$

Consequently, the heating values per unit time of the coils 9 and 23 of the embodiment $Q_{1p}$ and $Q_{2p}$ are expressed by the equations below.

$$Q_{1p} = I_1^2 R_1 = I^2 R_1 R_2^2/(R_1+R_2)^2$$

$$Q_{2p} = I_2^2 R_2 = I^2 R_1^2 R_2/(R_1+R_2)^2$$

As a result, the total Qp of heating values per unit time of the coils 9 and 23 of the embodiment is expressed by the equation (3) below.

$$\begin{aligned}Q_s &= Q_{1p} + Q_{2p} \\ &= I^2 R_1 R_2 (R_1 + R_2)/(R_1+R_2)^2 \\ &= I^2 R_1 R_2/(R_1+R_2)\end{aligned} \quad (3)$$

On the other hand, the total Qs of heating values per unit time of the coils 9 and 23 of the comparative example is expressed by the equation (4) below.

$$\begin{aligned}Q_s &= I^2 R_1 + I^2 R_2 \\ &= I^2 (R_1 + R_2)\end{aligned} \quad (4)$$

The value of $Q_p/Q_s$ is obtained from the equations (3) and (4) as below.

$$\begin{aligned}Q_p/Q_s &= R_1 R_2/(R_1+R_2)^2 \\ &= R_1 R_2/(R_1^2 + 2R_1 R_2 + R_2^2)\end{aligned}$$

Since it holds that $R_1 R_2 < (R_1^2 + 2R_1 R_2 + R_2^2)$, it holds that $Q_p/Q_s < 1$. That is, if comparison is made under the condition that the current fed to the whole of the two coils 9 and 23 is fixed, the total Qp of heating values per unit time of the coils 9 and 23 of the embodiment is smaller than the total Qs of heating values per unit time of the coils 9 and 23 of the comparative example, regardless of the relationship between $R_1$ and $R_2$ in magnitude. For example, if $R_1$ and $R_2$ are equal, the value of $Q_p/Q_s$ is one fourth. As thus described, according to the embodiment, if comparison is made under the condition that the current fed to the whole of the two coils 9 and 23 is fixed, the total of heating values of the two coils 9 and 23 is smaller than in the case in which the coils 9 and 23 are connected in series. As a result, it is possible to suppress protrusion of a portion of the medium facing surface 30 due to the heat generated by the two coils 9 and 23.

If the current fed to the whole of the two coils 9 and 23 is fixed, the magnetomotive force of the coil 23 decreases with increasing $R_2$. In view of this, it is preferred that $R_2$ be equal to or smaller than $R_1$.

The present invention is not limited to the foregoing embodiment but may be practiced in still other ways. For example, such a configuration is possible that: the direction of winding of the first coil from the outer connecting portion toward the inner connecting portion is the same as the direction of winding of the second coil from the outer connecting portion toward the inner connecting portion; the inner connecting portion of the first coil is electrically connected to the outer connecting portion of the second coil; and the outer connecting portion of the first coil is electrically connected to the inner connecting portion of the second coil.

In the embodiment at least a portion of the pole layer is formed in the groove 12a of the encasing layer 12. However, the pole layer of the invention is not limited to the one formed in such a manner but may be formed otherwise. For example, the pole layer may be formed by patterning a magnetic layer by etching, or may be formed by frame plating.

While the magnetic head disclosed in the embodiment has such a configuration that the read head is formed on the base body and the write head is stacked on the read head, it is also possible that the read head is stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:

a medium facing surface that faces toward a recording medium;

a first coil and a second coil for generating a magnetic field corresponding to data to be written on the recording medium;

a pole layer having an end face located in the medium facing surface, allowing a magnetic flux corresponding to the field generated by the first and second coils to pass therethrough, and generating a write magnetic field for writing the data on the recording medium by means of a perpendicular magnetic recording system;

a shield layer having an end face located in the medium facing surface and including a portion located away from the medium facing surface and coupled to the pole layer; and a gap layer made of a nonmagnetic material and provided between the pole layer and the shield layer, wherein:

in the medium facing surface, the end face of the shield layer is located forward of the end face of the pole layer along a direction of travel of the recording medium with a specific space created by a thickness of the gap layer; and the first and second coils are located in regions sandwiching the pole layer and are electrically connected to each other in parallel, and at least part of the second coil is located between the pole layer and the shield layer and insulated from the pole layer and the shield layer.

2. The magnetic head according to claim 1, wherein the first and second coils have different resistances.

3. The magnetic head according to claim 2, wherein the resistance of the second coil is lower than that of the first coil.

4. The magnetic head according to claim 2, wherein the first and second coils are made of different materials having different resistivities.

5. The magnetic head according to claim 1, wherein the first and second coils have equal resistances.

6. The magnetic head according to claim 1, wherein each of the first and second coils is flat-whorl-shaped.

7. The magnetic head according to claim 6, wherein: each of the first and second coils incorporates an inner connecting portion and an outer connecting portion opposite to the inner connecting portion; a direction of winding of the first coil from the outer connecting portion toward the inner connecting portion and a direction of winding of the second coil from the outer connecting portion toward the inner connecting portion are opposite to each other; the inner connecting portion of the first coil is electrically connected to the inner connecting portion of the second coil; and the outer connecting portion of the first coil is electrically connected to the outer connecting portion of the second coil.

* * * * *